United States Patent [19]

Shiratori

[11] Patent Number: 5,450,382

[45] Date of Patent: Sep. 12, 1995

[54] MAGNETO-OPTICAL RECORDING MEDIUM HAVING A LAYER THAT RETAINS ITS STATE OF MAGNETIZATION REGARDLESS OF THE PRESENCE OF AN EXTERNAL MAGNETIC FIELD, AND A RECORDING/REPRODUCING METHOD THEREFOR

[75] Inventor: Tsutomu Shiratori, Yokohama, Japan

[73] Assignee: Canon Kabushiki Kaisha, Tokyo, Japan

[21] Appl. No.: 232,581

[22] Filed: Apr. 25, 1994

Related U.S. Application Data

[63] Continuation of Ser. No. 154,130, Nov. 18, 1993, abandoned, which is a continuation of Ser. No. 953,837, Sep. 30, 1992, abandoned.

[30] Foreign Application Priority Data

Oct. 7, 1991 [JP] Japan .................................. 3-259276

[51] Int. Cl.[6] .......................... G11B 5/02; G11B 11/00
[52] U.S. Cl. ........................................ 369/13; 360/59
[58] Field of Search ................ 369/13, 14, 288, 275.4, 369/110; 360/59, 114; 365/122; 428/694, 900; 357/27

[56] References Cited

U.S. PATENT DOCUMENTS

| | | | |
|---|---|---|---|
| 4,771,347 | 9/1988 | Horimai et al. ...................... | 360/59 |
| 5,132,945 | 7/1992 | Osato et al. ............................ | 369/13 |
| 5,187,694 | 2/1993 | Ichihara et al. ........................ | 369/13 |
| 5,224,080 | 6/1993 | Ohtsuki ................................ | 369/13 |

FOREIGN PATENT DOCUMENTS

| | | |
|---|---|---|
| 0318925 | 6/1989 | European Pat. Off. . |
| 0415449 | 3/1991 | European Pat. Off. . |
| 393058 | 4/1991 | Japan . |

*Primary Examiner*—Ali Neyzari
*Attorney, Agent, or Firm*—Fitzpatrick, Cella, Harper & Scinto

[57] ABSTRACT

A magneto-optical recording medium has at least a first magnetic layer and a second magnetic layer which are mutually exchange-coupled. The first magnetic layer has a compensation temperature within a range higher than a room temperature but lower than the Curie temperature of the second magnetic layer. Under the application of an external magnetic field of a suitable intensity to the recording medium, the magnetization of the first magnetic layer is oriented in a stable direction with respect to the external magnetic field at the room temperature. At the vicinity of the compensation temperature of the first magnetic layer, the magnetization of the first magnetic layer is oriented in a stable direction with respect to the exchanging-coupling with the second magnetic layer. The second magnetic layer maintains a predetermined magnetization state at any temperature from the room temperature to the compensation temperature of the first magnetic layer regardless of the presence or absence of the external magnetic field.

5 Claims, 9 Drawing Sheets

MAGNETO-OPTICAL RECORDING MEDIUM HAVING A LAYER THAT RETAINS ITS STATE OF MAGNETIZATION REGARDLESS OF THE PRESENCE OF AN EXTERNAL MAGNETIC FIELD, AND A RECORDING/REPRODUCING METHOD THEREFOR

This application is a continuation of application Ser. No. 08/154,130, filed Nov. 18, 1993, which is a continuation of Ser. No. 07/953,837, filed Sep. 30, 1992, both of which are now abandoned.

BACKGROUND OF THE INVENTION

1. Field of the Invention

The present invention relates to a magneto-optical recording medium and a magneto-optical record/reproducing method, and more particularly to a magneto-optical recording medium provided at least with first and second magnetic layers which are mutually exchange-coupled, and a magneto-optical record/reproducing method utilizing said magneto-optical recording medium.

2. Related Background Art

Magnet-optical recording medium, on which the recording and reproduction are conducted by laser beam irradiation, are currently attracting attention as a recording medium capable of high density recording. For such a magneto-optical recording medium, there is currently employed a structure with at least two laminated magnetic layers with mutual magnetic coupling. In such a magneto-optical recording medium, various trials are being conducted for increasing the linear recording density and the track density, thereby enabling recording and reproduction with a higher recording density.

The minimum size of the irradiation area of a laser beam cannot be easily reduced, as it is defined by the diffraction limit of the laser beam and automatically determined by the wavelength λ of the laser beam and the numerical aperture of the optical system. On the other hand, since the recording process on the magneto-optical recording medium is basically a thermal process, a recording with a cycle length (pit length) less than the diffraction limit is achieved, by making the heated area smaller than the laser irradiated area. However, as the reproduction process is based on the magneto-optical effect, it is difficult, normally, to reproduce a signal of a cycle length smaller than the laser irradiation area. It is therefore important, for increasing the recording density of the magneto-optical recording medium, to enable reproduction of the signal of a smaller cycle length. Therefore, attempts have been made for increasing the recording density by improvements in the configuration of the magneto-optical recording medium or in the reproducing method.

As an example, the Japanese Patent Laid-open Application No. 3-93058 discloses a method of employing a multi-layered film including a reproduction layer and a record holding layer which are magnetically coupled, recording signals in said record holding layer while maintaining said reproduction layer in the erased state by aligning the magnetizing direction in advance, and then heating the reproduction layer with the laser beam irradiation, thereby transferring the magnetization of the record holding layer to the heated area of the reproduction layer and reproducing the signals from said heated area by means of the magneto-optical effect. In this method, in comparison with the area irradiated with the laser beam in the reproducing optical system, the area of the reproduction layer, heated to the temperature required for the transfer of magnetization, is smaller. Also, as the unheated area is in the erased state, the interference between the codes is reduced at the signal reproduction, so that the reproduction of signals of a cycle length less than the diffraction limit of the laser beam is rendered possible.

However, in the above-explained reproduction method in which the reproduction layer is maintained in the erased state in advance and the magnetization of the record holding layer is transferred to the reproduction layer under the laser beam irradiation, there is required an operation of applying an external magnetic field to the reproduction layer in a location different from the location of laser beam irradiation, in order to set the entire reproduction layer in the erased state prior to the reproducing operation, so that the record/reproducing apparatus becomes inevitably complex.

Also in case of effecting the multi-beam direct verification (effecting the recording operation and the verifying operation for reading the obtained record for confirming the proper recording operation, in collective manner with plural laser beams) with a single optical system for the purpose of increasing the recording speed, a verifying laser beam is to be directed to an area immediately after recording, but it is not possible to shift the reproduction layer of said area to the erased state within the interval from the recording operation to the succeeding verifying operation. For this reason, at said verifying operation, it is not possible to effect the above-explained method of reading the signal only from the area heated by laser beam irradiation.

SUMMARY OF THE INVENTION

The object of the present invention is to provide a magneto-optical recording medium which dispenses with the operation of applying an external magnetic field for erasing the reproduction layer in a location different from the location of laser beam irradiation, and also to provide a magneto-optical record/reproducing method capable of increasing the linear recording density and the track recording density, utilizing the above-mentioned magneto-optical recording medium, and allowing to improve the recording speed by the multi-beam direct verification.

The above-mentioned object can be attained by a magneto-optical recording medium having at least first and second magnetic layers which are mutually exchange-coupled, wherein:

said first magnetic layer has a compensation temperature within a range higher than the room temperature but lower than the Curie temperature of said second magnetic layer, and its magnetization is oriented, under the application of an external magnetic field of a suitable intensity to said magneto-optical recording medium, in a direction stable to said external magnetic field at said room temperature but in a direction stable with respect to the exchange interaction with said second magnetic layer at the vicinity of said compensation temperature, and said second magnetic layer maintains a predetermined magnetization state at any temperature from the room temperature to the vicinity of said compensation temperature, regardless of the presence or absence of said external magnetic field.

Also the above-mentioned object can be attained by a magneto-optical record/reproducing method for effecting recording/reproduction of information, employing a magneto-optical recording medium provided at least with a first magnetic layer which has a compensation temperature within a range higher than the room temperature but lower than the Curie temperature of a second magnetic layer and of which magnetization is oriented, under the application of an external magnetic field of a suitable intensity, in a direction stable to said external magnetic field at the room temperature but in a direction stable with respect to the exchange coupling interaction with the second magnetic layer at the vicinity of said compensation temperature, and a second magnetic layer which maintains a predetermined magnetization state at any temperature from the room temperature to the vicinity of said compensation temperature, regardless of the presence or absence of said external magnetic field, comprising steps of:

effecting information recording on said second magnetic layer; and irradiating the first magnetic layer of said magneto-optical recording medium with a laser light while applying said external magnetic field thereto, thereby elevating the temperature in a part of the irradiated area of said first magnetic layer to the vicinity of the compensation temperature thereof, thus orienting the magnetization of said part of the irradiated area same as the magnetization of said second magnetic layer, and orienting the magnetization of the remaining part of the irradiated area in a direction stable to said external magnetic field, whereby the information recorded in said second magnetic layer is reproduced from a change in the optical characteristic in the reflected light from said magneto-optical recording medium.

Also the above-mentioned object can be attained by a magneto-optical record/reproducing method for effecting reproduction of information simultaneous with recording information, employing a magneto-optical recording medium provided at least with a first magnetic layer which has a compensation temperature within a range higher than the room temperature but lower than the Curie temperature of a second magnetic layer and of which magnetization is oriented, under the application of an external magnetic field of a suitable intensity, in a direction stable to said external magnetic field at the room temperature but in a direction stable with respect to the exchange coupling interaction with said second magnetic layer at the vicinity of said compensation temperature, and a second magnetic layer which maintains a predetermined magnetization state at any temperature from the room temperature to the vicinity of said compensation temperature, regardless of the presence or absence of said external magnetic field, comprising a step of:

irradiating said magneto-optical recording medium with a laser beam while applying said external magnetic field thereto, thereby effecting information recording on said second magnetic layer, and elevating the temperature of a part of the irradiated area of the first magnetic layer to the vicinity of the compensation temperature thereof, thus orienting the magnetization in said part of the irradiated area same as the magnetization of said second magnetic layer, while orienting the magnetization in the remaining part of said irradiated area in a direction stable to said external magnetic field, whereby the information recorded on said second magnetic layer is reproduced, simultaneously with the recording thereof, from a change in the optical characteristic in the reflected light from said magneto-optical recording medium.

In the magneto-optical recording medium of the present invention, the first magnetic layer is oriented, under the application of an external magnetic field $H_E$ of a suitable intensity, in a stable direction with respect to said external magnetic field $H_E$ at the ambient temperature (room temperature or vicinity thereof) but in a stable direction with respect to the exchange coupling interaction with respect to the second magnetic layer in the vicinity of said compensation temperature $T_{comp}$, while the second magnetic layer maintains a predetermined magnetization state at any temperature from the ambient temperature to the vicinity of the compensation temperature $T_{comp}$. Therefore, at the recording and reproduction state, an area of the first magnetic layer (reproduction layer) immediately after recording or immediately before reproduction can be maintained in the erased state, merely by the application of the external magnetic field $H_E$ at the irradiating position of the laser beam at the recording and reproduction. This is because, in the area immediately after the recording or before the reproduction, the first magnetic layer is at the vicinity of the ambient temperature and is therefore oriented in a stable direction with respect to the external magnetic field $H_E$, It is therefore rendered unnecessary to apply the external magnetic field $H_E$ to a position other than the laser irradiating position. It is also rendered possible to read, immediately after the recording, the signals recorded with a high linear recording density and with a high track density utilizing a single optical system, so that the multi-beam direct verification becomes possible even in case of a high recording density. The signal recording in the second magnetic layer (record holding layer) can be made in a similar manner as in the conventional magneto-optical recording medium.

DETAILED DESCRIPTION OF THE PREFERRED EMBODIMENTS

In the following there will be explained embodiments of the present invention, with reference to the attached drawings.

Figure 1:
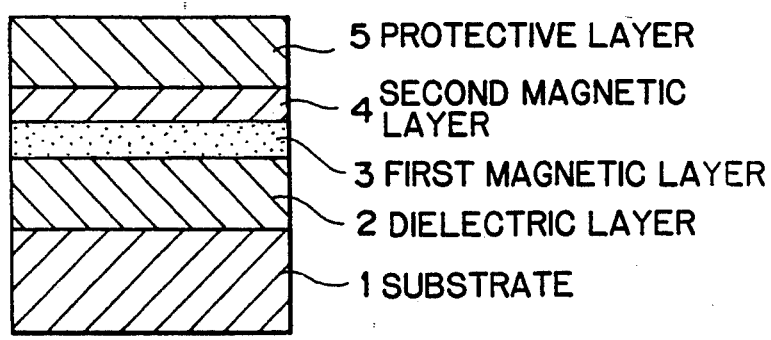
FIG. 1 is a schematic cross-sectional view of an embodiment of the magneto-optical recording medium of the present invention.

FIG. 1 is a schematic cross-sectional view of an embodiment of the magneto-optical recording medium of the present invention. On a transparent substrate 1 composed for example of polycarbonate or glass, there are formed in succession, a dielectric layer 2, a first magnetic layer 3 and a second magnetic layer 4, and again a dielectric layer 5 serving as a protective film. The dielectric layers 2, 5 can be composed of a transparent dielectric material such as $Si_3N_4$, AlN, $SiO_2$, SiO, ZnS or $MgF_2$. Said magnetic layers 3, 4 and the dielectric layers 2, 5 are formed by continuous sputtering or continuous evaporation for example by a magnetron sputtering apparatus. In particular, the magnetic layers 3, 4 achieve mutual exchange-coupling, by continuous formation without breaking vacuum.

In the above-explained magneto-optical recording medium, the magnetic layers 3, 4 can be composed of various magnetic materials, but they can particularly be composed of a rare earth-iron group amorphous alloy, composed of at least one of the rare earth metal elements such as Pr, Nd, Sm, Gd, Tb, Dy and Ho with an amount of 10-40 atom. %, and at least one of iron group elements such as Fe, Co and Ni with an amount of 90-60 atom. %. For improving the anticorrosion characteristic, there may be added a small amount of other elements such as Cr, Mn, Cu, Ti, Al, Si, Pt and In. However, since the first magnetic layer 3 is required to have a compensation temperature $T_{comp}$, the rare earth element is preferably selected from the heavy rare earth elements such as Gd, Tb, Dy and Ho. Such alloys show so-called ferrimagnetism, because of the antiparallel coupling of the magnetic moment of the heavy rare earth element and that of the iron group element. In such case, the net magnetization appears as the difference of the sub lattice magnetizations of both elements, and the compensation temperature where the sub lattice magnetizations become mutually can be arbitrarily controlled by the composition of both elements, because the temperature dependence of the magnetic moment is different between the rare earth element and the iron group element.

The Curie temperature can also be controlled by the composition ratio of the rare earth element and the iron group element, but, for a control independent from the saturation magnetization, there is preferably employed a method of principally utilizing Fe as the iron group element, with a partial replacement with Co, and controlling the amount of replacement thereof. More specifically, a replacement of 1 atom.% of Fe with Co is anticipated to provide an increase of about 6° C. in the Curie temperature, and this relationship is utilized for controlling the amount of Co in order to attain a desired Curie temperature. It is also possible to reduce the Curie temperature, by the addition of a small amount of a non-magnetic element such as Cr or Ti. The control of the Curie temperature is furthermore possible by two or more rare earth elements and regulating the composition ratio thereof.

In consideration of the operating temperature, the recording sensitivity and the reproduced signal quality, the preferred range for the Curie temperature $T_{c1}$ for the first magnetic layer 3 is 180° C. or more, that for the compensation temperature $T_{comp1}$ thereof is 80° C. or more, and that for the Curie temperature $T_{c2}$ of the second magnetic layer 4 is from 150° to 250° C. Also the thickness of the first magnetic layer 3 has to be so large as not to transmit the laser beam, and is preferably 300 Å or more in case the employed laser beam has a wavelength of about 800 nm.

In the following explained is the magneto-optical record/reproducing method of the present invention.

In the information recording on the above-explained magneto-optical recording medium of the present invention, the information is recorded in the second magnetic layer. Said recording can be achieved either by a method of applying a magnetic field, modulated according to the information while irradiating an unmodulated laser beam of a constant intensity, enough for heating the second magnetic layer to the vicinity of the Curie temperature, or a method of irradiating a laser beam modulated according to the information while applying an unmodulated magnetic field of a constant intensity. In either method, a record pit of size smaller than the laser irradiated area can be formed, by utilizing only a high temperature (heated) part in the laser irradiated area on the recording medium. This means that the signal can be recorded on the recording medium with a cycle length less than the diffraction limit of the laser beam.

The recorded information can be reproduced in the following manner.

At first, under the application of a magnetic field of a predetermined direction, the recording medium is irradiated with a laser beam of an intensity which heats the first magnetic layer to the vicinity of the compensation temperature only in the high temperature portion of the laser irradiated area. In this state, the magnetization of the first magnetic layer is oriented, in said high temperature portion, in a stable direction with respect to the magnetization of the second magnetic layer, but, in other portions, in a stable direction with respect to the external magnetic field. Thus, since the magnetization in the reproducing operation is always in a direction stable with respect to the external magnetic field, except for the high temperature portion in the laser irradiated area, the variation in the magneto-optical effect (such as Kerr effect) in the reflected light from the recording medium depends only on the magnetization state of said high temperature portion in the laser irradiated area. It is therefore rendered possible to detect the magnetization state of a surface area smaller than the laser irradiated area.

EXAMPLE 1

In a sputtering apparatus with five targets, a disk-shaped polycarbonate substrate 1 of a diameter of 86 mm, bearing thereon a spiral groove of a width of 0.8 μm and a mutual spacing of 0.8 μm, was set at a distance of 20 cm from the targets and was rotated. At first sputtering was conducted with a $Si_3N_4$ target in argon atmosphere to deposit a dielectric SiN layer 2 of a thickness of 600 Å on the substrate.

Then simultaneous sputtering was conducted with three targets of Gd, Fe and Co to form a first magnetic layer 3 of a thickness of 600 Å, composed of $Gd_{0.26}(Fe_{0.70}Co_{0.30})_{0.74}$ in which the magnetization of Gd sub lattice was prevailing. The composition of Gd-Fe-Co was controlled by regulating the electric powers supplied to the targets Gd, Fe and Co. Said first magnetic layer 3 had a Curie temperature $T_{c1}$ higher than 300° C., and a compensation temperature $T_{comp1}$ equal to 140° C.

Subsequently simultaneous sputtering was conducted with three targets of Tb, Fe and Co to form a second magnetic layer 4 of a thickness of 400 Å, composed of $Tb_{0.21}(Fe_{0.88}Co_{0.12})_{0.79}$ in which the magnetization of Fe—Co sub lattice was prevailing. Said second magnetic layer 4 had a Curie temperature $T_{c2}$ equal to 200° C.

On said second magnetic layer 4, there was formed a SiN dielectric layer 5 of a thickness of 600 Å, utilizing a $Si_3N_4$ target. Then the substrate 1 was taken out from the sputtering apparatus, and ultraviolet curable resin was spin coated and cured on the side of the magnetic layers 3, 4 to form a protective coating of a thickness of about 8 μm. A magneto-optical disk was completed in this manner.

Figure 2:
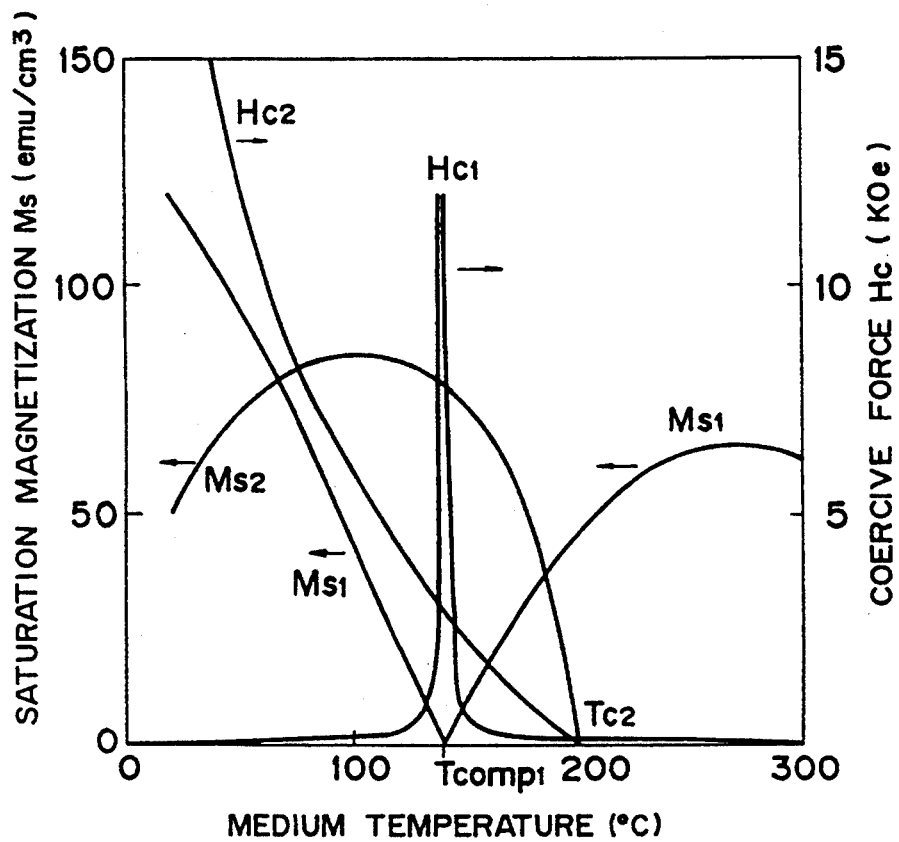
FIG. 2 is a characteristic chart showing the temperature dependence of saturation magnetization and coercive force of magnetic layers in said embodiment.
Figure 3:
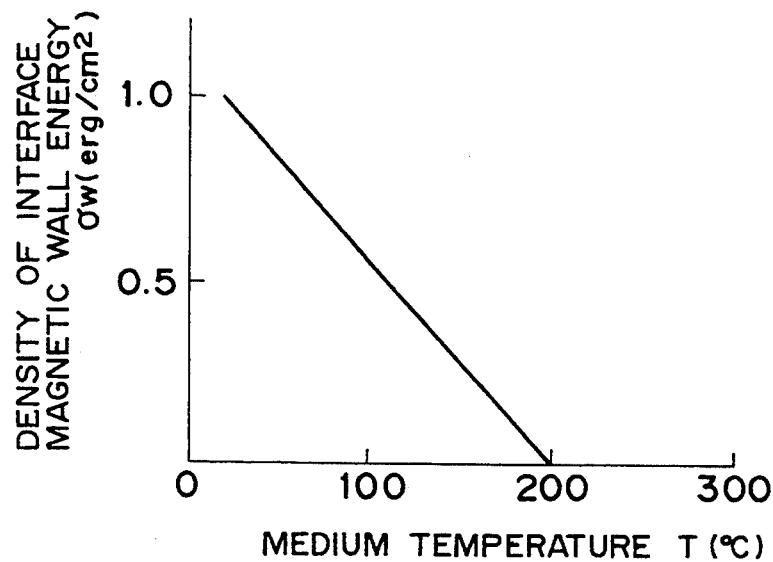
FIG. 3 is a characteristic chart showing the temperature dependence of an interface magnetic wall energy density between the first and second magnetic layers in said embodiment.

FIG. 2 shows the temperature dependence of saturation magnetizations $M_{s1}$, $M_{s2}$ and coercive forces $H_{c1}$, $H_{c2}$ of each of the first and second magnetic layers 3, 4. Also FIG. 3 shows the temperature dependence of the interface magnetic wall energy density $\sigma_w$ between the magnetic layers 3 and 4.

Figure 4:
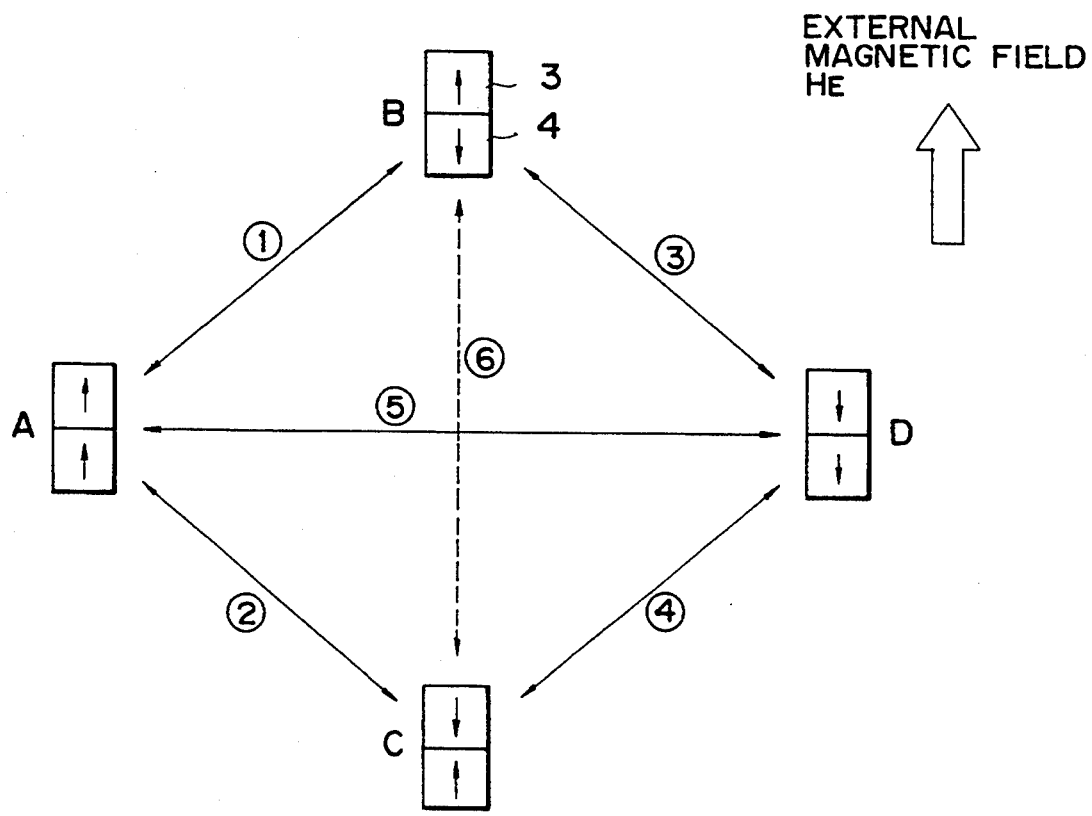
FIG. 4 is a view showing transitions among possible magnetization states of the first and second magnetic layers.

Such two-layered magnetic film can generally assume for magnetization states A–D shown in FIG. 4. In FIG. 4, the directions of TM spin (spin of the iron group element) of the first and second magnetic layers 3, 4 are indicated by arrows of solid line. The transitions among the magnetization states include those by the magnetization inversion of the first magnetic layer 3 only, as indicated by ② and ③, those by the magnetization inversion of the second magnetic layer 4 only, as indicated by ① and ④, and those by the simultaneous magnetization inversions of the first and second magnetic layers 3, 4 as indicated by ⑤ and ⑥ (though the transition ⑥ does not take place in practice).

Figure 5:
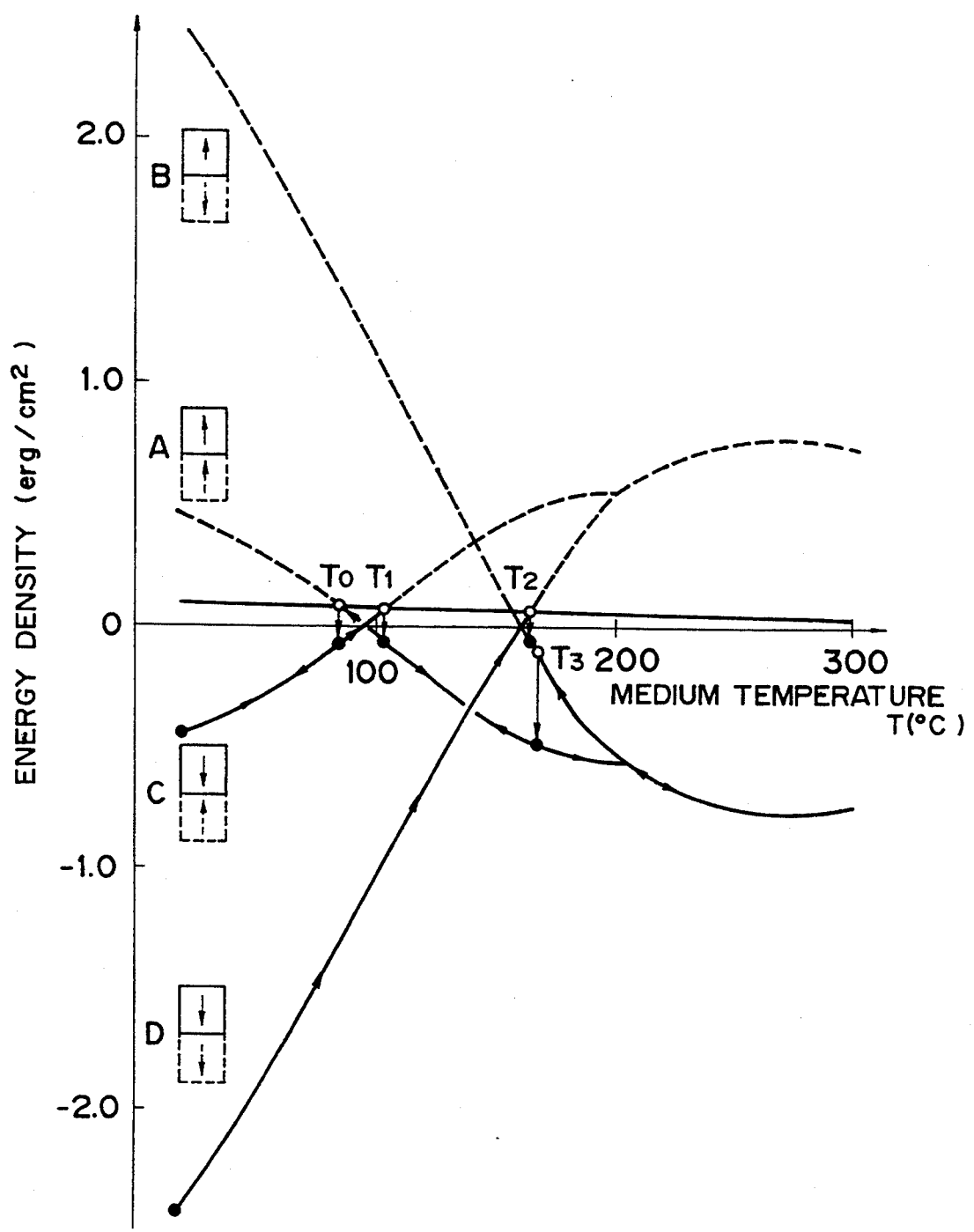
FIGS. 5, 6 and 7 are characteristic charts showing the relationship between the transition of the magnetization states and temperature in said embodiment.
Figure 6:
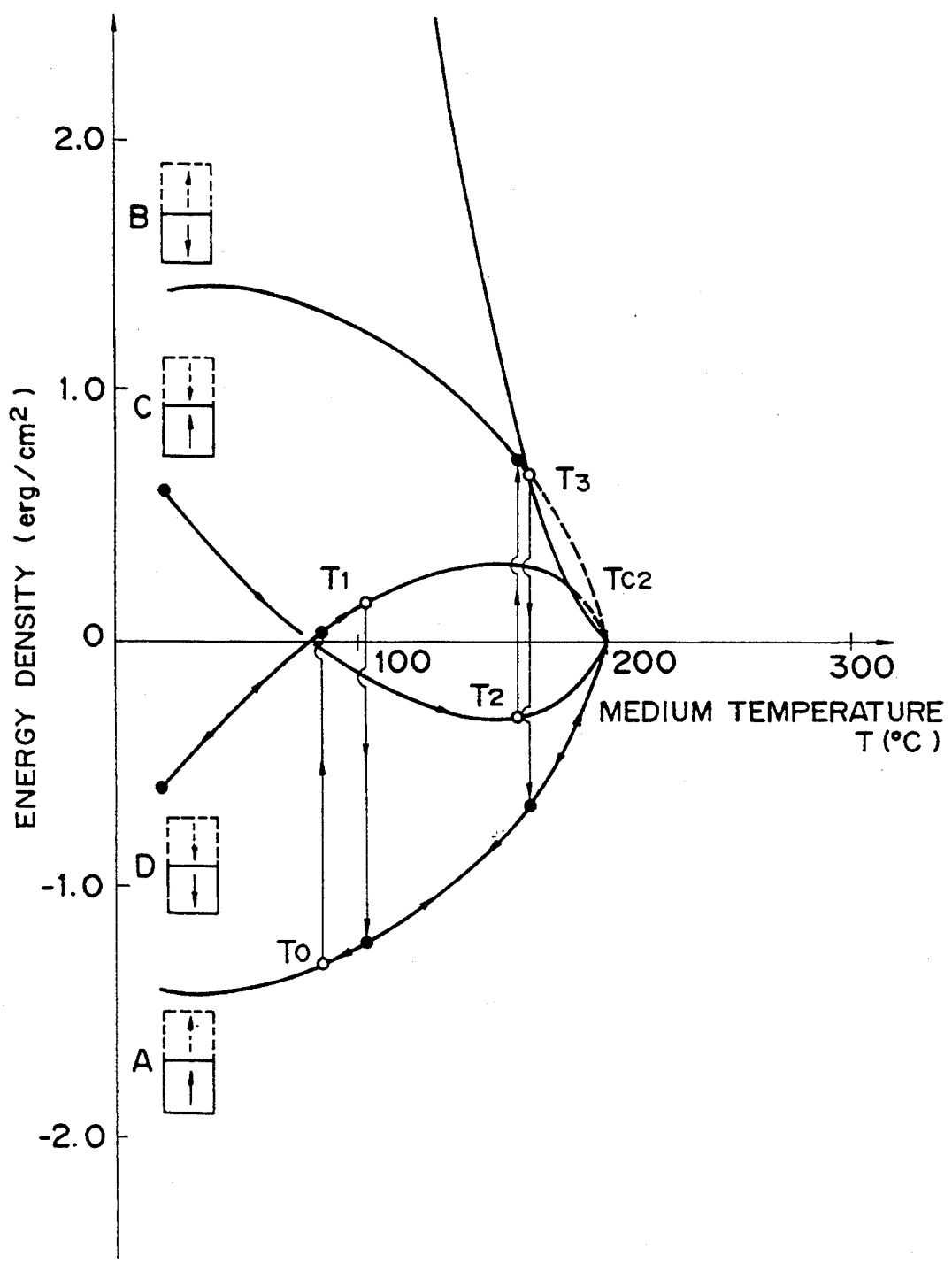
Figure 7:
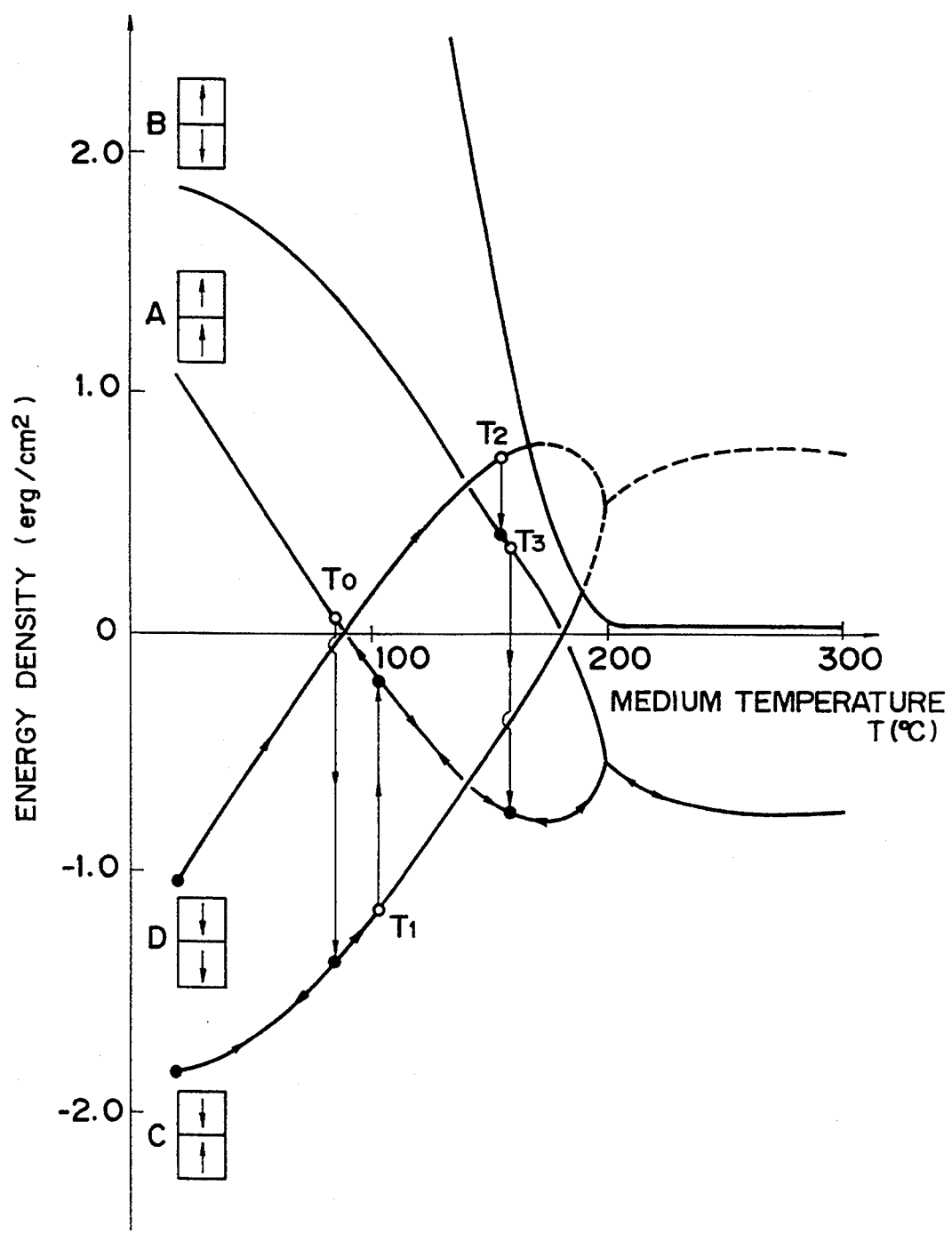

It is now assumed to apply an external magnetic field $H_E$ of 1.0 kOe to the magneto-optical disk, in a direction perpendicular to the film surface as indicated by a white arrow. FIG. 5 shows the total magnetic energy per unit area (sum of Zeeman energy and interface magnetic wall energy alone being considered) obtained by the magnetization inversion of the first magnetic layer 3 only from each of the magnetization states, calculated at different temperatures, based on FIGS. 2 and 3. Also the coercive force energy, calculated for the single first magnetic layer 3, also shown by a thick line. Similarly FIG. 6 shows the total magnetic energy per unit area, obtained by the magnetization inversion of the second magnetic layer 4 only, and the calculated coercive force energy of said second magnetic layer 4 only. Further, FIG. 7 shows the total magnetic energy per unit area, obtained by the simultaneous magnetization inversions of the first and second magnetic layers 3, 4, and the calculated total coercive force energies of the first and second magnetic layers 3, 4. Also in FIGS. 6, 7, the coercive energy is indicated by a thick line.

When the total magnetic energy, obtained by the magnetization inversion of a layer from a certain magnetization state exceeds the coercive force energy required for said inversion, said inversion actually takes place so that the transition of the magnetization state occurs. Consequently, each of the states A through D, in each of FIGS. 5 to 7, can exist only at a temperature where the line of the total magnetic energy corresponding to each state does not exceed the thick line indicating the coercive force energy.

Based on FIG. 5, at the ambient temperature, namely in the vicinity of the room temperature, the states A and B cannot exist and the states C and D alone can exist. In this state the first magnetic layer 3 has a downward TM spin (net magnetization being upward because the magnetization of the rare earth sub lattice is prevailing), stable with respect to the upward external magnetic field $H_E$.

With elevation of temperature from this state, the line of the total magnetic energy corresponding to the state C exceeds the line of the coercive force energy at a temperature $T_1$ in FIG. 5, whereby the magnetization inversion takes place in the first magnetic layer 3 only, causing the transition from the state C to A. At this temperature, the states A and D alone exist, and, since the TM spins of the magnetic layers 3, 4 are aligned in mutually parallel state, the first magnetic layer 3 is oriented in a stable state by exchange coupling with the second magnetic layer 4. With a further increase in the temperature, the line of the total magnetic energy corresponding to the state D exceeds the coercive force energy at a temperature $T_2$ shown in FIG. 5, whereby the magnetization inversion takes place in the first magnetic layer 3 only, causing the transition from the state D to B. With a further increase in the temperature, the line of the total magnetic energy corresponding to the state B exceeds the line of coercive force energy at a temperature $T_3$ in FIG. 6, whereby the magnetization inversion takes place in the second magnetic layer 4 only, causing the transition from the state B to A. Even if the temperature is further elevated, there is no change in the magnetization state, except that the second magnetic layer 4 loses the magnetization upon reaching the Curie temperature $T_{c2}$ thereof. When the temperature is lowered from this state, the line of the total magnetic energy corresponding to the state A exceeds the coercive force energy at a temperature $T_0$ in FIG. 5, whereby the magnetization inversion takes place only in the first magnetic layer 3, causing a transition from the state A to C.

In the above-explained process, in a temperature range from the ambient temperature to the temperature $T_2$, there does not take place the magnetization inversion of the second magnetic layer 4 only or the simultaneous inversions of the first and second magnetic layers 3, 4, and the second magnetic layer maintains a magnetization state.

Thus, by selecting the compensation temperature $T_{comp1}$ of the first magnetic layer 3 within a range lower than the Curie temperature $T_{c2}$ of the second magnetic layer 4 but higher than the ambient temperature, it is rendered possible to orient the magnetization of the first magnetic layer 3 according to the external magnetic field $H_E$ at the ambient temperature, but to orient it according to the magnetization of the second magnetic layer 4 in a suitable temperature range higher than the ambient temperature. In the actual magnetization process, it is necessary also to consider influence of Bloch magnetic wall energy and antimagnetic field energy, but these factors are omitted for the purpose of simplicity.

A carrier signal of 5 MHz was recorded on said magneto-optical disk with a linear speed of 5 m/sec., and the dependence of reproduced outputs of carrier and noise on the laser output was investigated under the application of a reproducing external magnetic field $H_E$ of 1.0 kOe. At the same time, the crosstalk was measured by recording a carrier signal of 5 MHz in a land area, then recording a carrier signal of 3.8 MHz in the grooves on both sides, and observing the spectral intensity of the signal of 3.8 MHz while reproducing the signal in the land area. The laser wavelength used in the recording and reproduction was 780 nm, and the numerical aperture of the objective lens was 0.55.

As a result, the carrier signal was not observed at a laser output of 1.6 mW or lower, and was observed starting from a laser output of 1.7 mW. This fact indicates that a part of the laser irradiated area reaches a temperature $T_1$ or higher at a laser output of 1.7 mW or higher, whereby the signal recorded in the second magnetic layer 4 is transferred to the first magnetic layer 3. The C/N ratio reached 45 dB and was almost saturated, at a laser output of 2.0 mW or higher. At a laser output of 3.4 mW or higher, a portion of the laser irradiated area reached a temperature $T_2$ or $T_3$ or even higher, and a decrease in the C/N ratio was observed for example due to a re-inversion of the first magnetic layer 3 or the deterioration of the magnetic domains in the second magnetic layer 4. Crosstalk was scarcely observed at a laser output of 2.5 mW or lower. This fact suggests that, at a laser output of 2.5 mW or lower, the width of the transfer area does not exceed 0.8 $\mu$m and does not reach the adjacent grooves. Based on these facts, this magneto-optical disk can achieve signal reproduction with a high C/N ratio and without crosstalk, by maintaining the laser output within a range from 2.0 to 2.5 mW.

EXAMPLE 2

A substrate was set in the sputtering apparatus and was subjected to the deposition of an SiN dielectric layer as in the example 1. Then formed was a first magnetic layer of a thickness of 300 Å, composed of $Gd_{0.26}(Fe_{0.70}Co_{0.30})_{0.74}$ in which magnetization of Gd sub lattice was prevailing. Said first magnetic layer had a Curie temperature $T_{c1}$ of 300° C. or higher, and a compensation temperature $T_{comp1}$ of 140° C.

Then, for regulating the interface magnetic wall energy density $\sigma_w$, simultaneous sputtering with two targets of Gd and Co was conducted to form an intermediate layer of a thickness of 100 Å, composed of $Gd_{0.34}Co_{0.66}$ with prevailing magnetization of Gd sub lattice. Said intermediate layer has a Curie temperature of 300° C. or higher, but did not have the compensation temperature.

Subsequently simultaneous sputtering was conducted with three targets of Dy, Fe and Co to form a second magnetic layer of a thickness of 400 Å, composed of $Dy_{0.24}(Fe_{0.80}Co_{0.20})_{0.76}$ with prevailing magnetization of Dy sub lattice. This layer had a Curie temperature $T_{c2}$ of 190° C. and a compensation temperature $T_{comp1}$ of 70° C.

Thereafter a dielectric SiN layer of a thickness of 300 Å and an aluminum thermal diffusion layer of a thickness of 450 Å, for regulating the temperature profile at the laser beam irradiation, were formed. Thereafter a magneto-optical disk was prepared in the identical manner as in the example 1.

Figure 8:
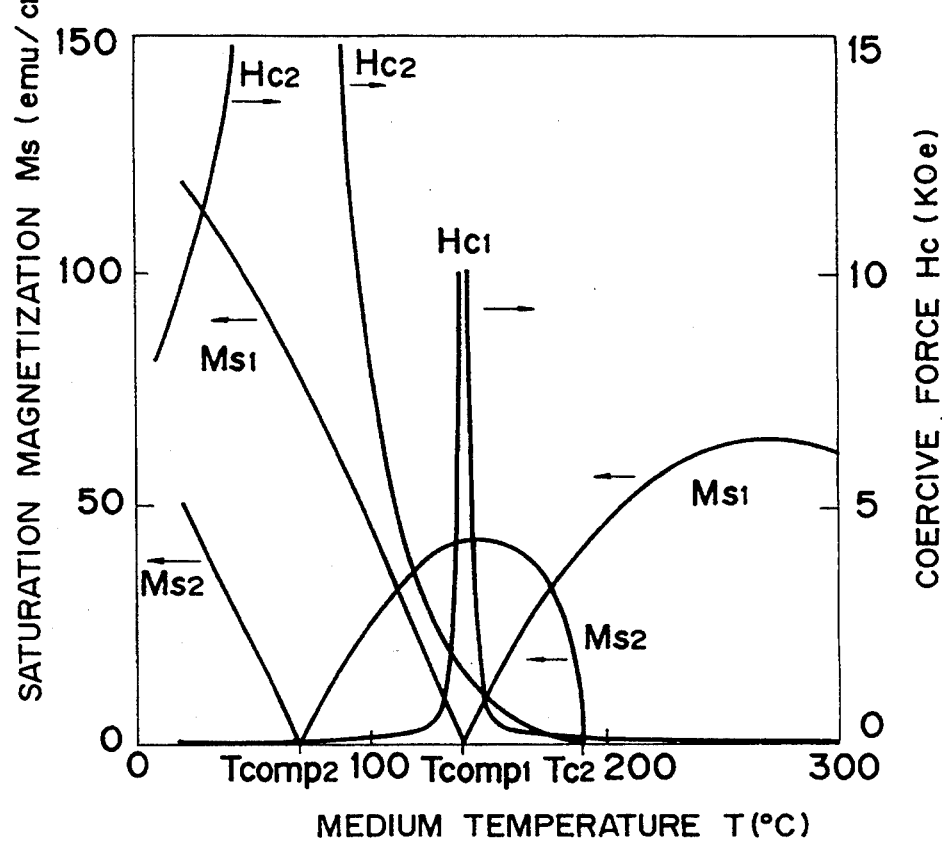
FIG. 8 is a characteristic chart showing temperature dependence of saturation magnetization and coercive force of the magnetic layers in a second embodiment.
Figure 9:
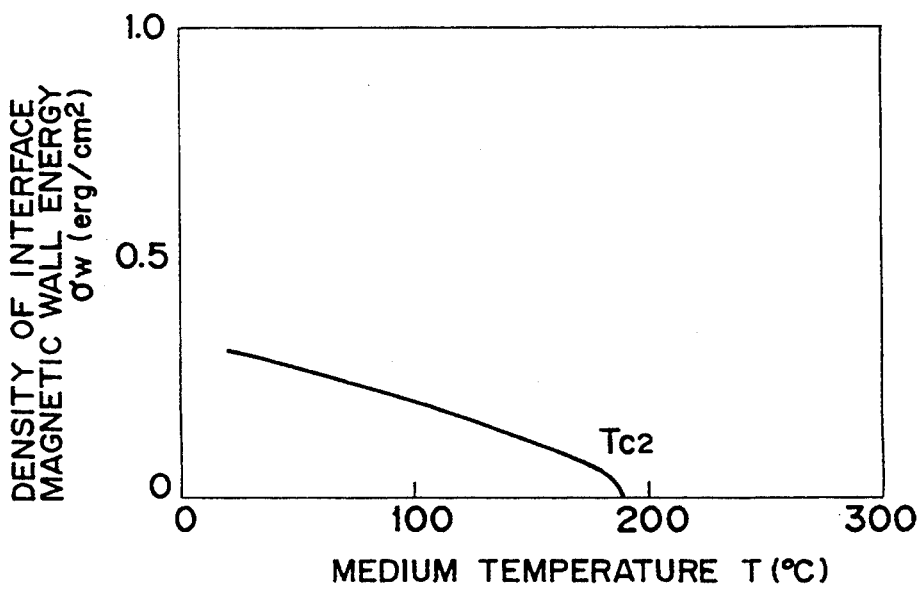
FIG. 9 is a characteristic chart showing temperature dependence of the interface magnetic wall energy density between the first and second magnetic layers in the second embodiment.

FIG. 8 shows the temperature dependence of saturation magnetizations $M_{s1}$, $M_{s2}$ and coercive forces $H_{c1}$, $H_{c2}$ of the first and second magnetic layers in the individual state. Also FIG. 9 shows the temperature dependence of the interface magnetic wall energy density $\sigma_w$ between the first and second magnetic layers. The magnetization of such multi-layered magnetic film can assume the four states A to D shown in FIG. 4 only, if the first and second magnetic layers alone are considered.

Figure 10:
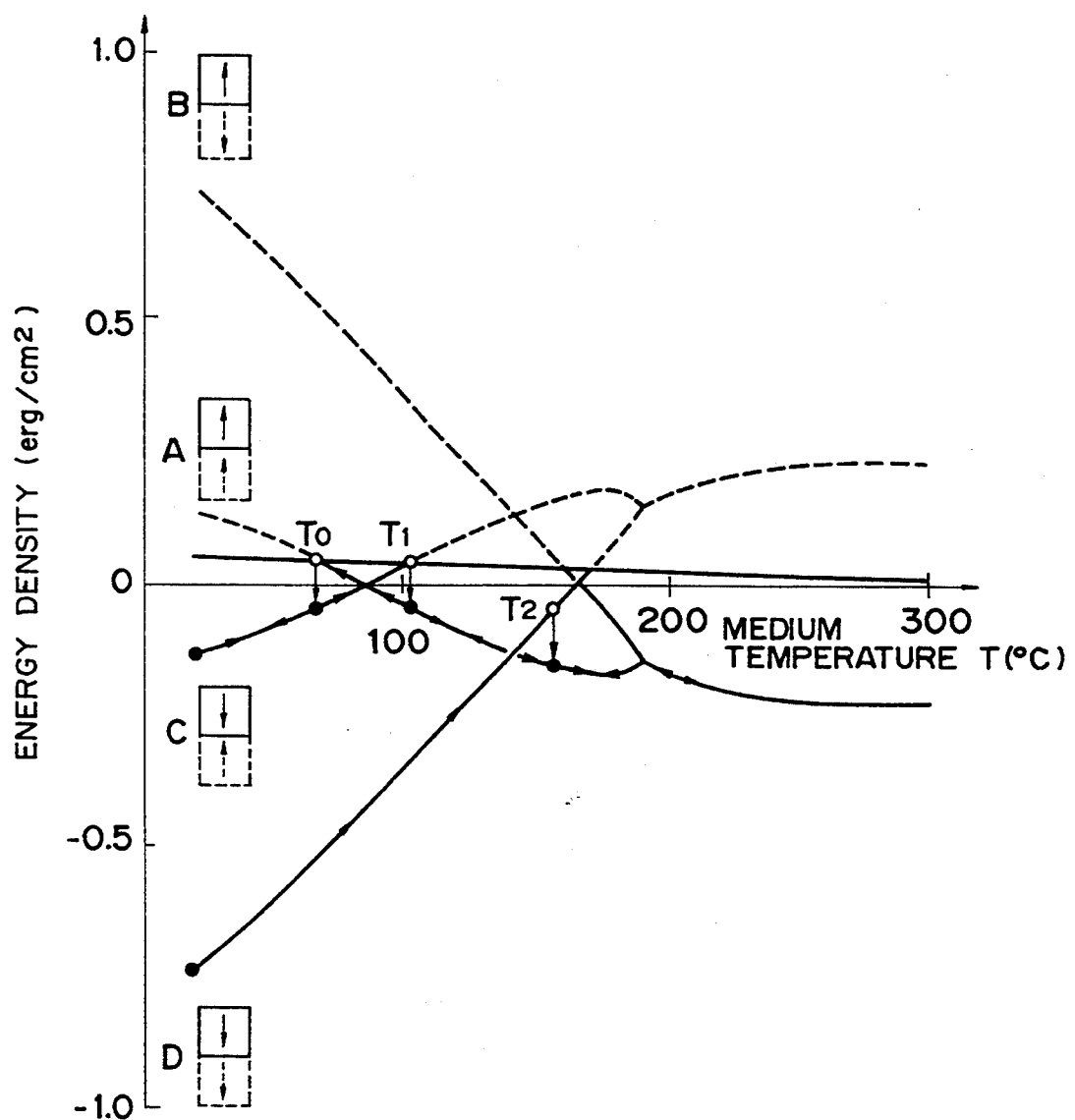
FIGS. 10, 11 and 12 are characteristic charts showing the relationship between the transition of the magnetization states and temperature in said second embodiment.
Figure 11:
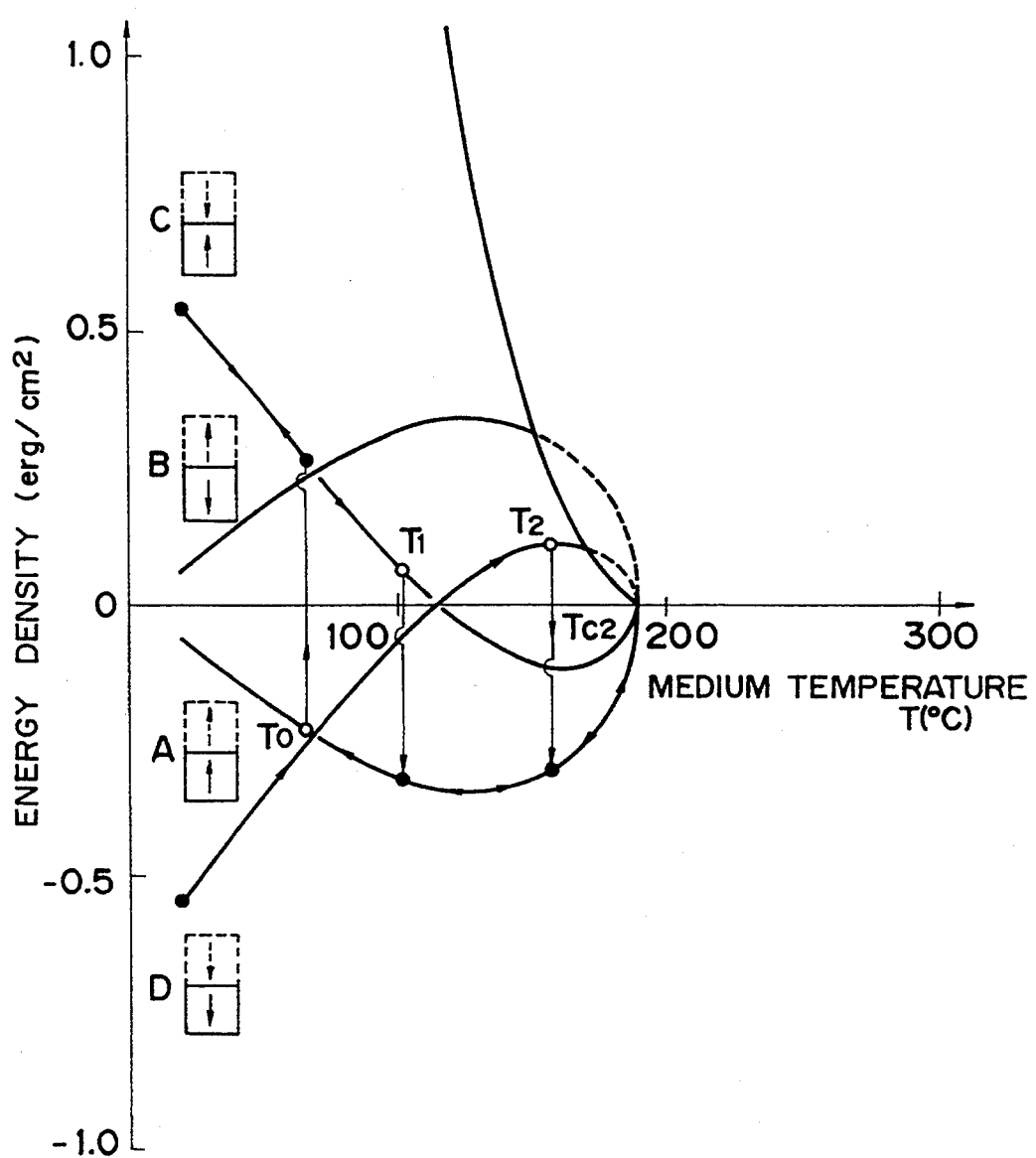
Figure 12:
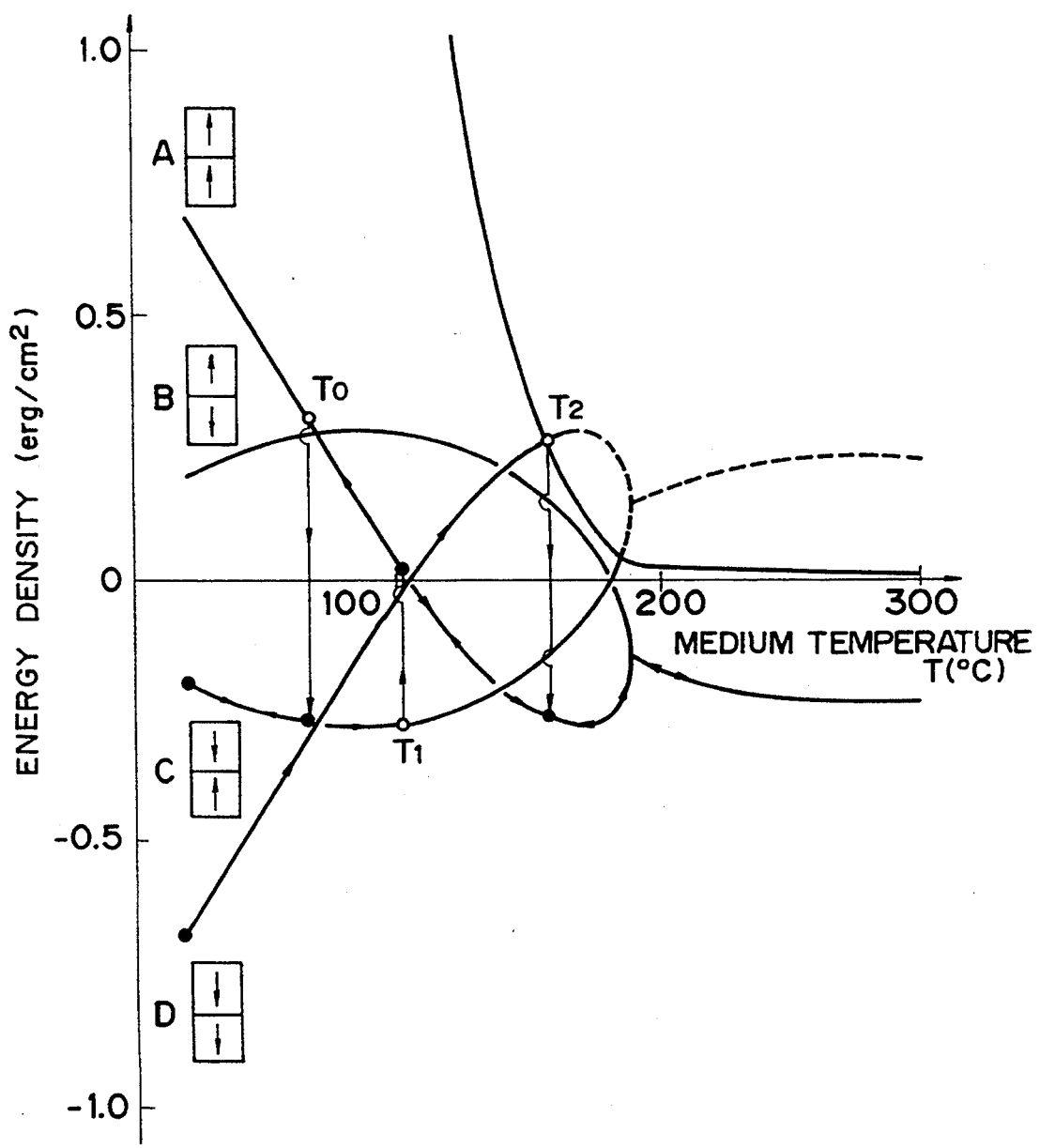

It is now assumed to apply an external magnetic field $H_E$ of 600 Oe to said magneto-optical disk, in a direction perpendicular to the film surface thereof, as indicated by a white arrow in FIG. 4. FIG. 10 shows the total magnetic energy per unit area, obtained by the magnetization inversion of the first magnetic layer only, from different magnetization states, as calculated for different temperature according to FIGS. 8 and 9, and the coercive force energy calculated for the single first magnetic layer. Similarly FIG. 11 shows the total magnetic energy per unit area, obtained by the magnetization inversion of the second magnetic layer only, and the calculated coercive force energy of the second magnetic layer only. Also FIG. 12 shows the total magnetic energy obtained by simultaneous magnetization inversions of the first and second magnetic layers, and the total coercive force energy of the first and second magnetic layers. In these FIGS. 10 to 12, the coercive force energy is indicated by a thick line.

As shown in FIG. 10, at the ambient temperature, the states A and B cannot exist, and the states C and D alone can exist. The first magnetic layer is in a stable state to the external magnetic field $H_E$.

With a temperature increase from this state, the line of total magnetic energy corresponding to the state C exceeds the line of the coercive force energy at a temperature $T_1$ shown in FIG. 10, whereby the first magnetic layer 1 effects magnetization inversion, causing a transition from the state C to A. At said temperature $T_1$, the states A and D alone can exist, and the first magnetic layer is oriented in a stable state with respect to the coupling state due to exchange-coupling with the second magnetic layer. With a further increase in the temperature, the line of total magnetic energy corresponding to the state D exceeds the line of coercive force energy at a temperature $T_2$ in FIG. 12, whereby magnetization inversion takes place simultaneously in the first and second magnetic layers, thus causing a transition from the state D to A. A further increase in the temperature does not alter the magnetization state, except that the second magnetic layer loses magnetization upon reaching the Curie temperature $T_{c2}$ thereof. When the temperature is lowered from this state, the line of total magnetic energy corresponding to the state A exceeds the line of coercive force energy at a temperature $T_0$ in FIG. 10, whereby the magnetization inversion takes place in the first magnetic layer alone, thus causing a transition from the state A to C.

In the above-explained process, in a temperature range from the ambient temperature to $T_2$, there does not take place the magnetization inversion of the second magnetic layer alone or the simultaneous magnetization inversion of the first and second magnetic layers, and the second magnetic layer maintains a predetermined magnetization state. Consequently the first magnetic layer is in the erased state at the ambient temperature, and receives transfer of the magnetization of the second magnetic layer within a temperature range from $T_1$ to $T_2$.

Recording on and reproduction from said magneto-optical disk were conducted with an optical head provided with plural laser elements in a single optical system and capable of focusing the light beams from said laser elements in positions which are separate by 20 $\mu$m in the track direction. The disk was moved with a linear speed of 5 m/sec. under the application of an external record/reproducing magnetic field $H_E$ of 600 Oe, and a carrier signal of 5 MHz was recorded by a leading beam while an area immediately after recording was read with a trailing beam. In this operation there was investigated the dependence of carrier and noise in the reproduced output on the power of the trailing laser beam. Also the crosstalk was measured in the same manner as in the example 1.

As a result, signal reproduction was possible with a high C/N ratio and without crosstalk, when the power of the trailing laser beam was maintained within a range from 1.8 to 2.6 mW.

What is claimed is:

1. A magneto-optical recording medium provided at least with mutually exchange-coupled first and second magnetic layers, wherein:

said first magnetic layer has a compensation temperature within a range higher than room temperature and lower than the Curie temperature of said second magnetic layer, and the magnetization of said first magnetic layer is oriented, under the application of an external magnetic field of a suitable intensity to said magneto-optical recording medium, in a direction that is stable with respect to said external magnetic field at room temperature and is oriented in a direction that is stable with respect to the exchange-coupling with said second magnetic layer at a temperature in the vicinity of said compensation temperature; and said second magnetic layer maintains a predetermined magnetization state at any temperature from room temperature to said compensation temperature, regardless of the presence or absence of said external magnetic field.

2. A magneto-optical recording medium according to claim 1, wherein each of said first and second magnetic layers is composed of a rare earth-iron group amorphous alloy.

3. A magneto-optical recording medium according to claim 2, wherein said first magnetic layer has a Curie temperature equal to 180° C. or higher and a compensation temperature equal to 80° C. or higher, and said second magnetic layer has a Curie temperature within a range from 150° C. to 250° C.

4. A magneto-optical recording/reproducing method for effecting information recording and/or reproduction utilizing a magneto-optical recording medium provided at least with a first magnetic layer and a second magnetic layer, in which said first magnetic layer has a compensation temperature within a range higher than room temperature and lower than the Curie temperature of said second magnetic layer and of which magnetization is oriented, under the application of an external magnetic field of a suitable intensity, in a direction that is stable with respect to said external magnetic field at room temperature and is oriented in a direction that is stable with respect to the exchange-coupling with said second magnetic layer at a temperature in the vicinity of said compensation temperature, and in which said second magnetic layer maintains a predetermined magnetization state at any temperature from said room temperature to the vicinity of said compensation temperature irrespective of the presence or absence of said external magnetic field, said method comprising the steps of:

effecting recording of information on said second magnetic layer; and irradiating the first magnetic layer of said magneto-optical recording medium with a laser beam, while applying said external magnetic field thereto, thereby heating a portion of the irradiated area in said first magnetic layer to a temperature in the vicinity of the compensation temperature thereof, and thereby orienting the magnetization of said portion of the irradiated area in a direction that is stable with respect to the exchange-coupling with said second magnetic layer, while orienting the magnetization of the remaining portion of said irradiated area in a direction that is stable with respect to said external magnetic field, whereby the information recorded on said second magnetic layer is reproduced from a variation in the optical characteristic of light reflected from said magneto-optical recording medium.

5. A magneto-optical recording/reproducing method for effecting simultaneous recording and reproduction of information, utilizing a magneto-optical recording medium provided at least with a first magnetic layer and a second magnetic layer, in which said first magnetic layer has a compensation temperature within a range higher than room temperature and lower than the Curie temperature of said second magnetic layer and of which magnetization is oriented, under the application of an external magnetic field of a suitable intensity, in a direction that is stable with respect to said external magnetic field at room temperature and in a direction that is stable with respect to the exchange-coupling with said second magnetic layer at a temperature in the vicinity of said compensation temperature, and in which said second magnetic layer maintains a predetermined magnetization state at any temperature from room temperature to the vicinity of said compensation temperature irrespective of the presence or absence of said external magnetic field, said method comprising the steps of:

irradiating said magneto-optical recording medium with a recording laser beam while applying said external magnetic field thereto, thereby effecting recording of information on said second magnetic layer; and irradiating said magneto-optical recording medium with a reproducing laser beam in the vicinity of the recording-laser-beam-irradiated area of said magneto-optical recording medium, thereby heating a portion of the reproducing-laser-beam-irradiated area of said first magnetic layer to a temperature in the vicinity of the compensation temperature thereof, and thereby orienting the magnetization of said portion of the reproducing-laser-beam-irradiated area of said first magnetic layer in a direction that is stable with respect to the exchange-coupling with said second magnetic layer while orienting the magnetization of the remaining portion of the reproducing-laser-beam-irradiated area in a direction that is stable with respect to said external magnetic field, whereby the information recorded on said second magnetic layer is reproduced, simultaneously with the recording, from a variation in the optical characteristic of light reflected from said magneto-optical recording medium.

* * * * *

UNITED STATES PATENT AND TRADEMARK OFFICE
CERTIFICATE OF CORRECTION

PATENT NO. : 5,450,382
DATED : September 12, 1995
INVENTOR(S) : TSUTOMU SHIRATORI It is certified that error appears in the above-indentified patent and that said Letters Patent is hereby corrected as shown below:

ON THE TITLE PAGE:

[56] References Cited, Under the
Subheading FOREIGN PATENT DOCUMENTS:

Line 3, "393058 4/1991 Japan" should read
--3-93058 4/1991 Japan--.

COLUMN 1:

Line 25, "Magnet-optical" should read --Magneto-optical--; and "medium," should read --media,--.

COLUMN 2:

Line 21, "Also" should read --Also,--.

COUMN 4:

Line 29, "field $H_e$," should read --field $H_e$.--.

COLUMN 5:

Line 43, "mutually" should read --mutually equal--.

UNITED STATES PATENT AND TRADEMARK OFFICE
CERTIFICATE OF CORRECTION

PATENT NO. : 5,450,382
DATED : September 12, 1995
INVENTOR(S) : TSUTOMU SHIRATORI It is certified that error appears in the above-indentified patent and that said Letters Patent is hereby corrected as shown below:

COLUMN 9:

Line 35, "$Gd_{0.26}(Fe0.70Co_{0.30})_{0.74}$ should read --$Gd_{0.26}(Fe_{0.70}Co_{0.30})_{0.74}$--.

Signed and Sealed this

Thirteenth Day of February, 1996

BRUCE LEHMAN

Attest:

Attesting Officer

Commissioner of Patents and Trademarks